(12) United States Patent
David

(10) Patent No.: US 7,505,779 B1
(45) Date of Patent: Mar. 17, 2009

(54) SYSTEM AND METHOD FOR FACILITATING PROXIMITY-BASED COMMUNICATION THROUGH DYNAMIC COMMUNICATION DEVICE REGISTRATION

(76) Inventor: Scott L. David, 10425 NE. Brackenwood Ln, Bainbridge Island, WA (US) 98110

( * ) Notice: Subject to any disclaimer, the term of this patent is extended or adjusted under 35 U.S.C. 154(b) by 680 days.

(21) Appl. No.: 11/107,547

(22) Filed: Apr. 15, 2005

(51) Int. Cl.
*H04B 7/00* (2006.01)

(52) U.S. Cl. ..................... 455/518; 455/90.2
(58) Field of Classification Search ............... None
See application file for complete search history.

(56) References Cited

U.S. PATENT DOCUMENTS

| 5,471,646 A * | 11/1995 | Schultz ............... 455/519 |
| 2003/0186716 A1* | 10/2003 | Dorenbosch et al. ........ 455/519 |
| 2005/0186970 A1* | 8/2005 | Yates et al. ............. 455/456.5 |
| 2006/0111135 A1* | 5/2006 | Gray et al. ................ 455/519 |

* cited by examiner

Primary Examiner—Alexander Eisen
Assistant Examiner—Dai A Phuong
(74) Attorney, Agent, or Firm—Patrick J. S. Inouye

(57) ABSTRACT

A system and method for facilitating proximity-based communications through dynamic communication device registration is presented. Collections of offered descriptive parameters autonomously selectable by subscribers of uniquely identified communication devices are stored. A presence of a plurality of the communication devices within a localized physical coverage area is registered. Subscriber autonomous selections of the offered descriptive parameters from the communication devices are enrolled on a dynamic basis. A request to communicate with at least one other subscriber from a requesting subscriber having a communication device within the same localized physical coverage area is processed. One or more responding subscribers having communication devices within the localized physical coverage area are continuously identified. Selected sets of the offered descriptive parameters of the requesting subscriber and of the responding subscribers are autonomously compared. The requesting subscriber of at least one matching offered descriptive parameters set is notified.

24 Claims, 12 Drawing Sheets

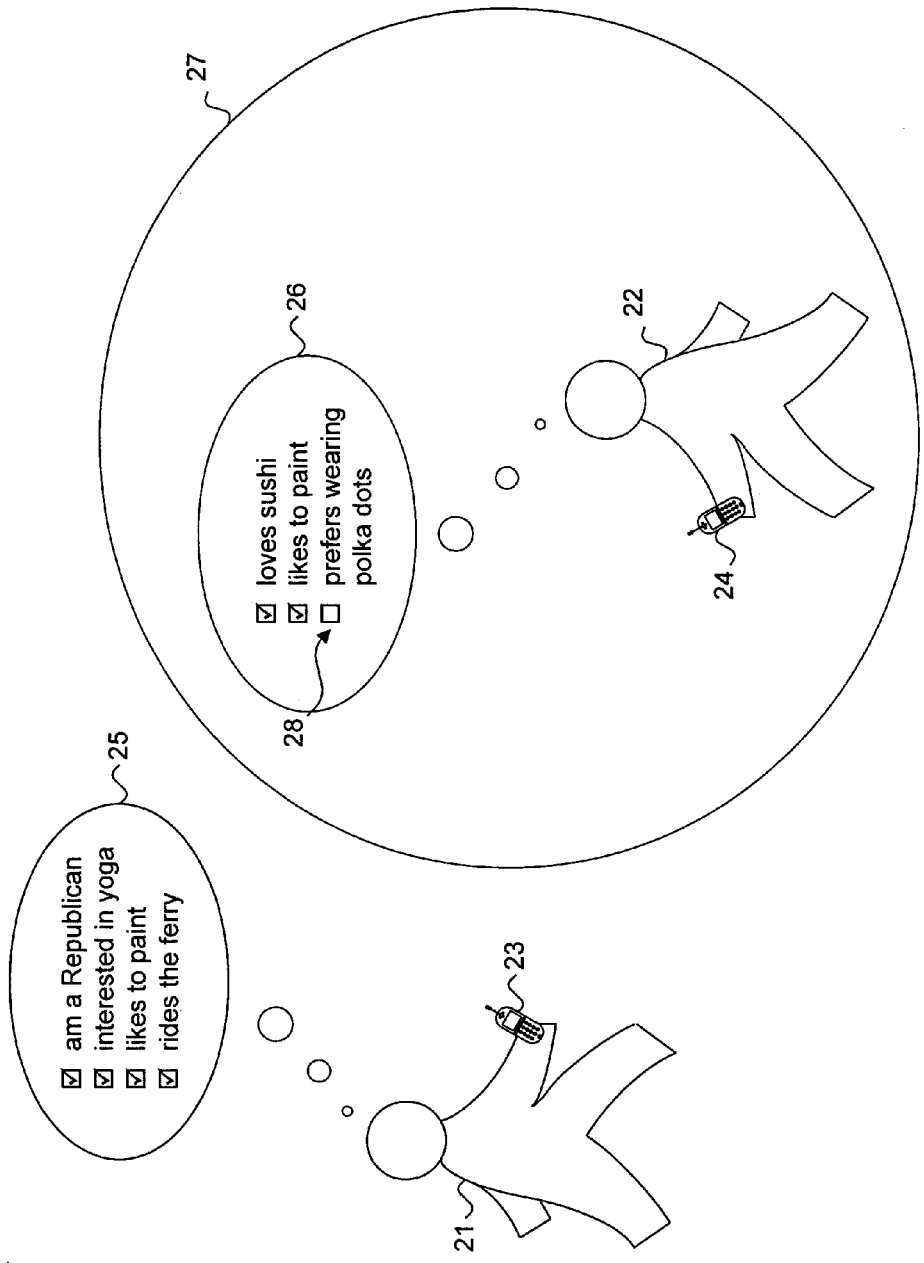

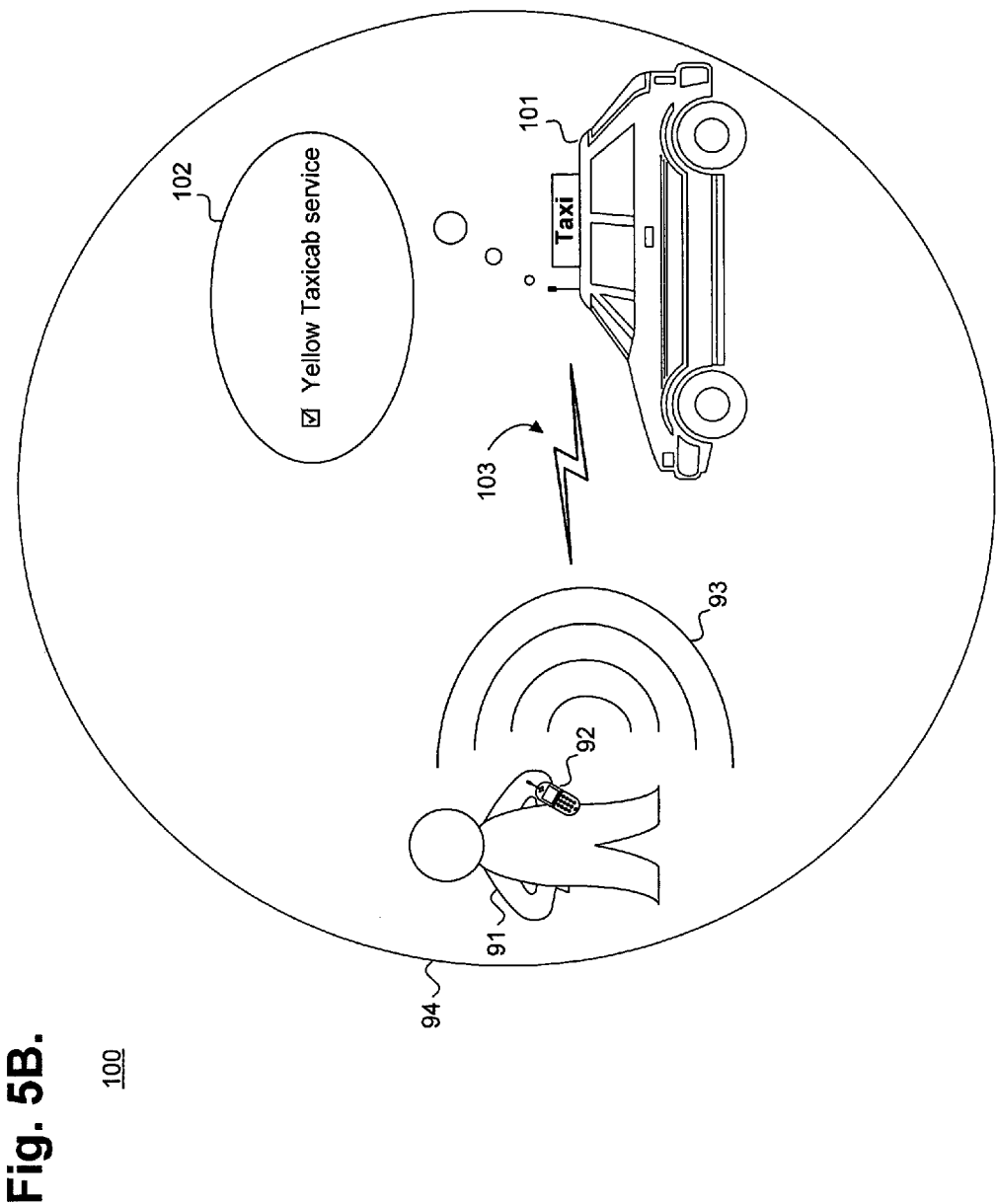

150

SYSTEM AND METHOD FOR FACILITATING PROXIMITY-BASED COMMUNICATION THROUGH DYNAMIC COMMUNICATION DEVICE REGISTRATION

FIELD OF THE INVENTION

The invention relates in general to communication device communications, such as mobile and non-mobile communication devices, and, in particular, to a system and method for facilitating proximity-based communication through dynamic communication device registration.

BACKGROUND OF THE INVENTION

Communication devices, particularly mobile telephones and related portable devices, such as email communicators and messaging pagers, have become ubiquitous personal accessories for business and personal communications worldwide. Such mobile devices typically interface to conventional public switched telephone networks through radio-based communication that provides standard dialup telephone services.

By design, mobile devices provide communications from virtually anywhere, whether stationary or moving. However, the communications are intended to occur only between specific parties, with the narrow exception of well-known public emergency and information services. Party-to-party communications are initiated by calling telephone numbers for specific parties. Open-ended ad hoc communications using less specific unstructured information is generally not possible. For example, in a social setting, such as a night-club or science fiction convention, a mobile device would be of little use in helping a person to meet other persons or groups sharing a common interest. The person would need to have a directory or other information source that lists the mobile device telephone numbers for other people at the same event. Similarly, in a travel situation, such as when seeking a particular type of food or requiring a taxicab, a concierge or guidebook would be more helpful than a mobile device since finding the telephone number for restaurants and taxicabs requires local knowledge of the area being visited.

Although, mobile devices provide communications in a manner similar to conventional land-based telephones, mobile devices also include tracking features that enable a mobile switching center ("MSC") to locate specific mobile devices. Often during the course of a telephone call, subscribers will move around, such as while driving or walking. Mobile service providers use the tracking features to complete incoming calls. Except in emergency situations, mobile service providers do not use the tracking features to locate subscribers for other purposes. For instance, some subscribers may want to meet other people sharing a common interest who are physically nearby and who could be identified through location information available to the mobile service provider. Due to privacy and liability concerns, subscribers must instead rely on pre-existing information sources or upon mere chance to meet other people or groups who hopefully share that same interest.

Cellular telephones are one popular form of mobile device that include tracking features. Cellular service networks have a hierarchical component structure. At the base of the hierarchy, cellular telephones are used by individual subscribers to access the network. Each cellular telephone is uniquely identified by a mobile identification number ("MIN") and an electronic serial number ("ESN"). In the United States and Canada, the MIN is a ten-digit telephone number that includes an area code and dialing area prefix. The ESN is a thirty two-bit binary number assigned by the manufacturer. An ESN cannot be changed by the subscriber. The MIN and ESN are used to identify cellular telephones to Base Stations at the next level of the hierarchy. Base Stations are radio transceivers. The physical coverage areas of Base Stations, known as "cells," are physically configured into an overlapping grid that each provide cellular service to mobile devices physically located within one or more of the cells. Groups of overlapping cells form clusters that are interconnected to MSCs at the top level of the hierarchy. Multiple Base Stations are interconnected to form the complete cellular network and are also connected to public switched telephone networks. MSCs are often supplemented with Home Location Registries.

Home Location Registries provide centralized databases storing subscriber preferences. The types of preferences offered by a mobile communications service provider are dictated by the type of mobile device used and the calling features offered, such as call forwarding, call waiting, three-way calling, voice mail, and so forth. Preferences independent of the mobile device, such as the subscriber's personal interests and needs, are not tracked by Home Location Registries and are, accordingly, not shared with other subscribers or groups that are physically proximal.

Therefore, there is a need for an approach to allowing communication and, in particular, mobile device subscribers to select personalized preferences to share and with other subscribers that are physically nearby. Preferably, such an approach would allow communications between consenting subscribers, while protecting privacy and against misuses and abuses of the information offered or shared. Such an approach would also preferably allow subscribers to engage in ad hoc communications with individuals, groups, and public, commercial and emergency services.

SUMMARY OF THE INVENTION

Subscribers of a mobile communications service can voluntarily participate in an open-ended communications service offered by a service provider to initiate and engage in communications with other participating subscribers co-located within a localized physical coverage area. Each subscriber has a uniquely identified communications device, such as a mobile or non-mobile device. Each participating subscriber registers with the service provider to select a set of subscriber parameters defined independently from preferences that are attributable to either their communications device or the communications service. The subscriber parameters can reflect personal, cultural, social, religious, political, commercial, physical, and other interests and needs of each subscriber. Privacy is ensured by providing subscriber localized coverage area preferences that filter, screen, or hide information, such as name or telephone number. The subscriber parameters and localized coverage area preferences can be changed dynamically and in real time. Matching of subscriber parameters is triggered when the communications device of a participating subscriber enters into the same localized physical coverage area as the communications devices of one or more other participating subscribers or when a subscriber parameter is changed. The participating subscriber that requested communication receives a notification of one or more matching subscriber parameters and, if allowed by the subscriber localized coverage area preferences of the matched subscribers, can request further information or initiate communications.

An embodiment provides a system and method for facilitating proximity-based communications through dynamic communication device registration. Collections of offered descriptive parameters autonomously selectable by subscribers of uniquely identified communication devices are stored. A presence of a plurality of the communication devices within a localized physical coverage area is registered. Subscriber autonomous selections of the offered descriptive parameters from the communication devices are enrolled on a dynamic basis. A request to communicate with at least one other subscriber from a requesting subscriber having a communication device within the same localized physical coverage area is processed. One or more responding subscribers having communication devices within the localized physical coverage area are continuously identified. Selected sets of the offered descriptive parameters of the requesting subscriber and of the responding subscribers are autonomously compared. The requesting subscriber of at least one matching offered descriptive parameters set is notified.

The invention provides several benefits to service providers of both mobile communications and related services, such as non-mobile communications and hybrid communications. First, facilitating inter-subscriber communications helps to differentiate service providers within the marketplace. Open-ended communications services can be offered separately or combined with other calling packages. In addition, mobile service providers benefit from increased call volume and are afforded an opportunity to generate additional revenue through charges for participation, number and nature of subscriber parameters and localized coverage area preferences, time of transmissions, and so forth.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

BRIEF DESCRIPTION OF THE DRAWINGS

FIGS. 2A-C are diagrams showing, by way of example, one-to-one active proximity-based communication using the system of FIG. 1.

FIGS. 5A-B are diagrams showing, by way of example, a passive-to-active proximity-based communication using the system of FIG. 1.

DETAILED DESCRIPTION

System Description

Mobile device usage is exemplified by the manner in which cellular telephones are provided access to a cellular telephone service network. Although described herein with reference to cellular telephone service provision, the invention contemplates other forms of mobile device interconnectivity, including non-cellular communications services, such as satellite and radio frequency-based networks, as well as direct connections from mobile device to mobile device and related services, such as non-mobile communications and hybrid communications. In addition, users of non-mobile devices may also benefit from the service, particularly where the system facilitates contact between a non-mobile device and a mobile device, or between non-mobile devices in high population areas, where the users of the non-mobile devices might not otherwise contact one another based on the selected parameters.

Figure 1:
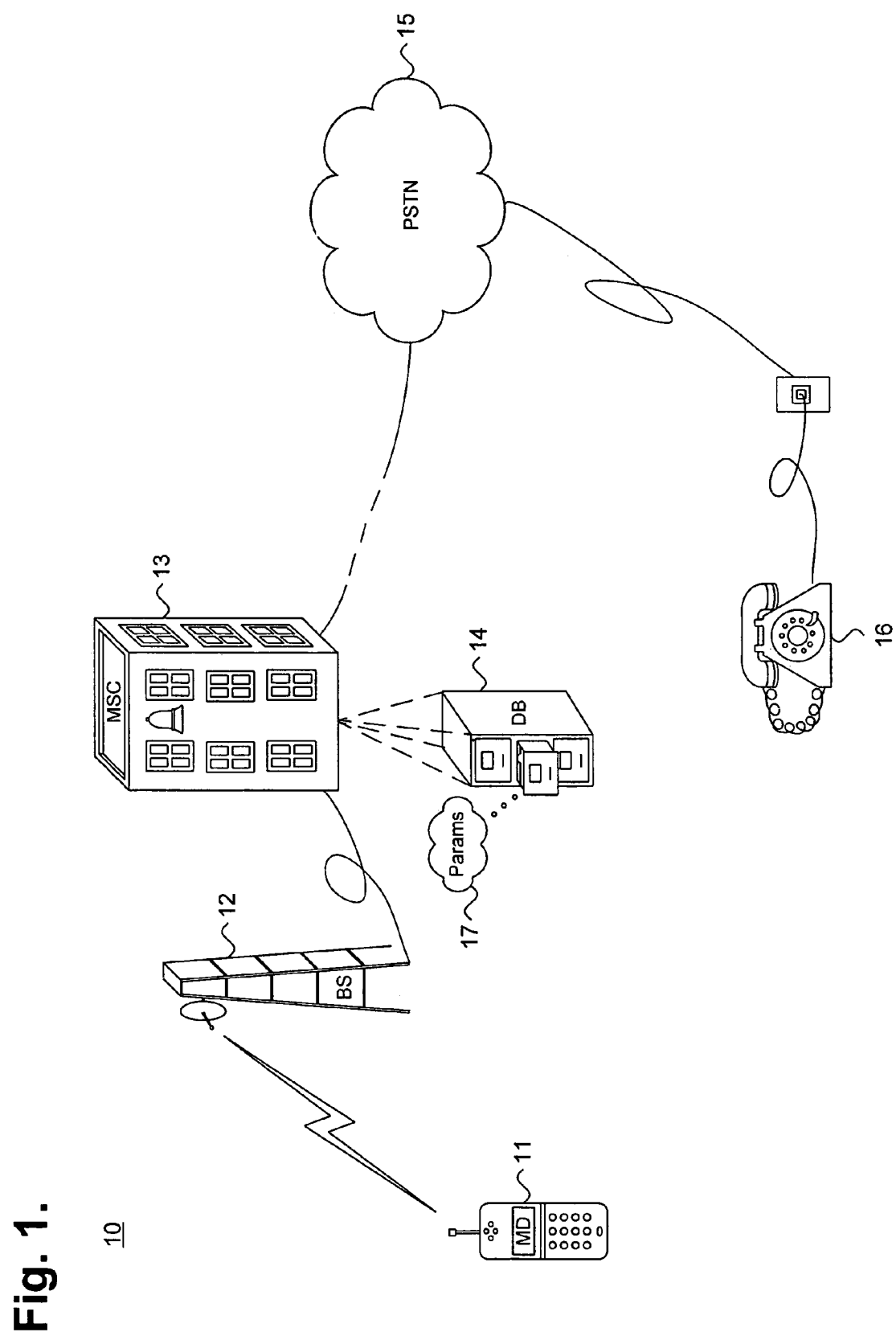
FIG. 1 is a block diagram showing, by way of example, a system for facilitating proximity-based communication through dynamic communication device registration, in accordance with one embodiment.

Using a cellular mobile communications network as an example, FIG. 1 is a block diagram showing a system 10 for facilitating proximity-based communication through dynamic communication device registration, in accordance with one embodiment. Through the system 10, a subscriber using a mobile device 11 is able to call conventional land-line based telephones 16, as well as other mobile devices 11, both within and independently from the mobile communications service. The mobile communications service network can provide voice, data, and other forms of information exchange. For clarity, only a single cellular service network is shown, although multiple service networks could be required to support disparate network services for various types of communications and computing devices. For example, voice information exchange could be provided through cellular communications service networks including, by way of example, Advanced Mobile Phone Service (AMPS), Global System for Mobile communications (GSM), and code-division multiple access (CDMA) networks. Data information exchange could be provided through enterprise, wide area, or local area networks including, by way of example, transmission control protocol/Internet protocol (TCP/IP), IEEE 802.3 (Ethernet), IEEE 802.11 (WiFi), IEEE 802.16 (WiMAX), and BlueTooth networks. The service network can include various topologies, configurations, and arrangements of network interconnectivity components and can further include, without limitation, conventional wired, wireless, satellite, optical, and equivalent network topologies, as would be appreciated by one skilled in the art. The system 10 has a hierarchical structure that includes, starting from the base, mobile devices 11, Base Stations 12, and Mobile Switching Centers 13. Other types of structures and topologies, including non-hierarchical and direct device-to-device interconnections, are possible.

The mobile devices include mobile telephones, including dedicated and multi-purpose handsets, and mobile devices, such as e-mail communicators and messaging pagers. Other types of mobile devices are possible. In addition, mobile devices 11 include cellular and non-cellular telephones, wireless-enabled personal data assistance (PDA), wireless-enabled personal computers, and two-way features. Other types of network and external devices, such as global positioning system (GPS) receivers, automobile, personal, and boat navigation systems, pagers, and text messaging devices, could also be used, as would be appreciated by one skilled in the art. Each mobile device 11 is operated by an individual subscriber that subscribes to a mobile communications service offered by a service provider that operates, leases, or otherwise has access to the Base Stations 12 and Mobile Switching Centers 13. The Base Stations 12 each define a discrete localized physical area of service coverage that can extend from several yards to, more typically, several miles. The physical coverage areas preferably overlap to provide the subscribers with continuous, non-interrupted service, although geographic topology, weather conditions, and physical obstructions may affect actual delivered coverage.

Groups of Base Stations defining neighboring cells are formed into clusters that are interconnected to a centralized Mobile Switching Center. Each Mobile Switching Center 13 is interconnected with other Mobile Switching Centers 13 and is connected with a public switched telephone network 15 that interfaces to a traditional telephone communications network.

Each Mobile Switching Center 13 centrally stores or has access to subscriber information, which allows each Mobile Switching Center 13 to validate each mobile device 11 for access to the mobile communications network. The subscriber information also enables each Mobile Switching Center 13 to track the location of each mobile device 11 by cluster and cell to complete calls made to the MIN assigned to the mobile device 11. Information to allow a subscriber to make calls outside of the home market may also be stored. Generally, service providers maintain the subscriber information in one or more Home Location Registries (not shown) storing feature profiles for each subscriber, such as calling features, dialing restrictions, and similar information.

Since the control over and whereabouts of each mobile device 11 is subject to the discretion and travels of the subscriber, certain operations must take place whenever a mobile device 11 is turned on or travels into a new cell. Upon power up, the mobile device 11 searches for the strongest control and paging channels, which are respectively used by a Base Station 12 and Mobile Switching Center 13 to exchange control information and complete incoming calls. Upon identifying the control and paging channels, the mobile device 11 registers with the physically nearest base station 12 by transmitting the MIN and ESN. When entering a new cell, the Mobile Switching Center 13 orchestrates a handoff from the former Base Station 12 to the gaining Base Station 12 that transfers the Base Station registration and ensures uninterrupted service provision. Typically, handoffs require only a few milliseconds to occur and are imperceptible to users, although bad handoffs do occur and can result in a temporary service interruption.

The tracking of the cell location of mobile devices 11 is an inherent aspect of mobile communications and occurs on a continuing and, from a user's prospective, transparent basis. The features being offered with individual mobile devices 11, as well as the capabilities of the infrastructure supporting a mobile communications network, are becoming increasingly sophisticated and have begun to incorporate complementary technologies. For instance, integrated Global Positioning System (GPS) tracking enables a higher degree of accuracy in locating mobile devices 11, which can be used for personal or emergency services. Other types of complementary technologies are possible.

Open-ended communications service can be offered to subscribers by supplementing the mobile communications service infrastructure with a database 14 storing a set of offered descriptive parameters 17, either as part of or separately from the subscriber information maintained by the service provider. The descriptive parameters that are offered by the service provider can include personal, cultural, social, religious, political, commercial, physical, and other interests and needs that a subscriber selects and permits to be matched against the descriptive parameters of other subscribers identified within the same co-located physical coverage area. The offered descriptive parameters 17 are selectable by individual subscribers autonomously and independently from the service provider-driven preferences maintained in each feature profile stored in the Home Location Registry. Through the offered descriptive parameters 17, each subscriber can create a personalized set of criterion that can be dynamically selected to allow subscribers to engage in ad hoc communications with individuals, groups, and public, commercial and emergency services, as further described below beginning with reference to FIGS. 2A-C et seq. To facilitate matching, the descriptive parameters are defined by service providers, and may include both general and specific categories. For example, a general category, such as "Likes movies," may be presented for subscriber selection by a service provider. In addition, specific categories, such as "Likes comedy movies" or "Likes action movies," may be presented. A match of parameters could occur where identical specific or general categories are selected by different subscribers, or where one subscriber selects a general category, such as "Likes movies" and the other subscriber selects a specific subcategory of that general category, such as "Likes action movies." Service providers may also offer subscribers the ability to "tune" their parameter selections to identify more or less identical matches, depending on user preference.

Proximity-Based Communication Example

The offered descriptive parameters 17 enable subscribers to create a personalized and dynamically-adjustable profile of themselves that is used by the service provider to facilitate ad hoc communications with other participating subscribers. In one embodiment, participation is optional, as is the selection of descriptive parameters. In a further embodiment, a subscriber can select parameters describing different types of people, places, businesses, and services, of which to be notified and with which to potentially communicate.

Figure 2B:
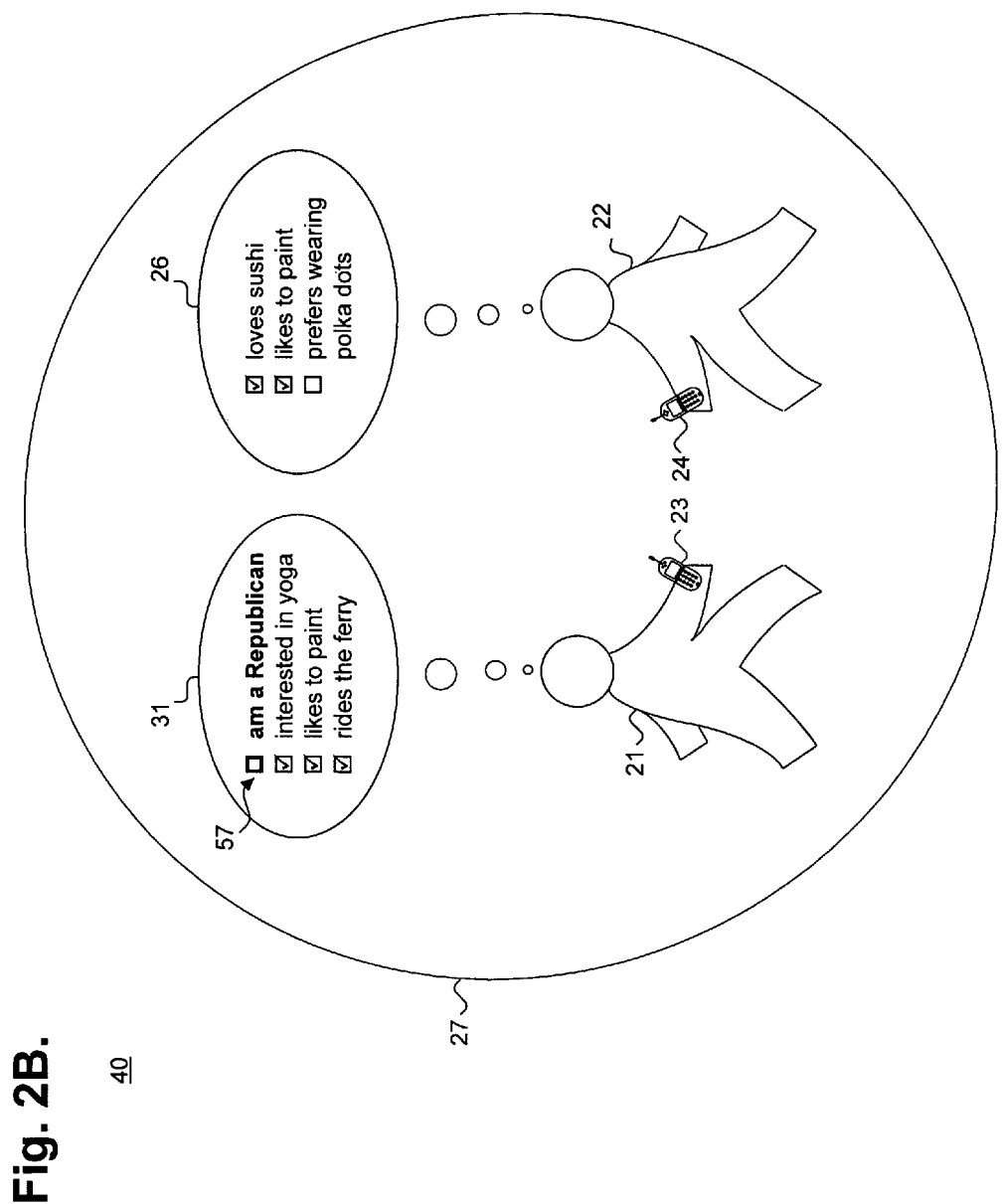
Figure 2C:
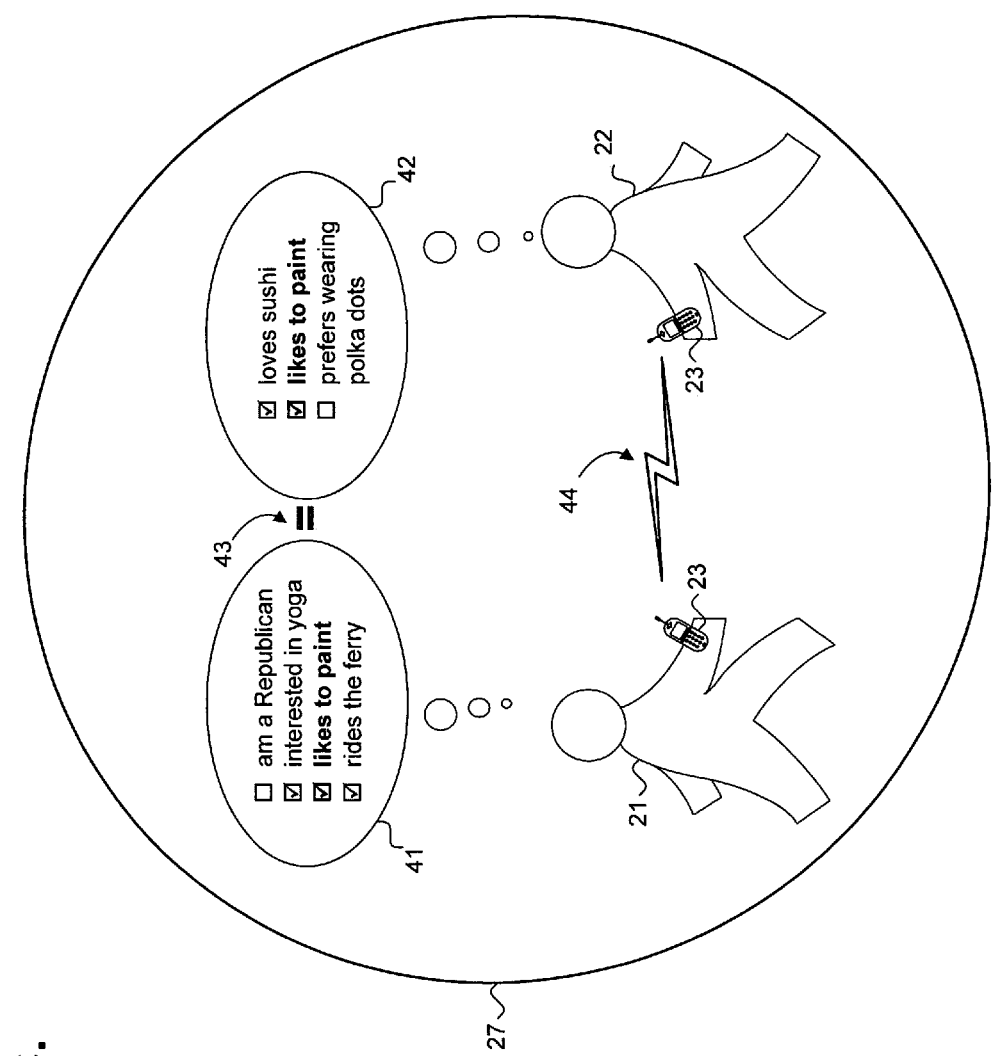

Open-ended communications are allowed between pairs of active participating subscribers or with groups of active participating subscribers, between an active participating subscriber and a passive participating subscriber, and between a passive participating subscriber and an active participating subscriber. FIGS. 2A-C are diagrams 20, 30, 40 showing, by way of example, one-to-one active proximity-based communication using the system 10 of FIG. 1. One-to-one active communication is triggered by physical proximity of participating subscribers that expect to engage in a conversation. Referring first to FIG. 2A, a pair of subscribers 21, 22 to a mobile communications service provider, termed requesting subscriber 21 and responding subscriber 22, are both active participants that have consented to allow the service provider to facilitate communications. Both subscribers use mobile devices 23, 24 and have selected sets of descriptive parameters 25, 26 that reflect the types of information that they are willing to share publicly through the service provider. For example, the requesting subscriber 21 is willing to share that he is a Republican, is interested in yoga, likes to paint, and rides the ferry, whereas the responding subscriber 22 is willing to share that she loves sushi and also likes to paint, but is unwilling to share that she prefers wearing polka dots 28.

Although both subscribers are willing participants, the service provider will not attempt to compare their respective sets of descriptive parameters 25, 26 until they both are co-located within the same localized physical coverage area 27. The localized physical coverage area 27 can be specified based on fixed sets of boundaries, such as latitude, longitude, and elevation, or can be fluid boundaries, such as defined by a cell within a cellular communications network. The localized physical coverage area may be set based on subscriber preferences, for example, one mile or 300 feet, for which requests can be accommodated by service providers using various technological methods to establish subscriber location, such as GPS, triangulation, signal strength, and so forth. Other combinations of fixed and fluid boundaries are possible.

Individual subscribers, even if willing participants, will not be matched against other subscribers until and if they are both co-located within a recognized localized physical coverage area 27. Referring next to FIG. 2B, the requesting subscriber 21 has entered into the same localized physical coverage area 27 as the responding subscriber 22. Prior to entering into the localized physical coverage area 27, however, the requesting subscriber 21 decided that he no longer wanted others to know that he is a Republican 57 and has revised his set of descriptive parameters 31. Dynamic changes to the sets of descriptive parameters 26, 31 can occur at any time independent of localized physical coverage areas and can include the addition, deletion, or modification of available descriptive parameters 26, 31, as well as the creation of new descriptive parameters 26, 31 as allowed by the service provider. Dynamic changes can also trigger communication between physically-proximal participating subscribers.

Assuming that the subscribers are still participating, the service provider attempts to match descriptive parameters 26, 31 when one or both of the subscribers 21, 22 has entered the same localized physical coverage area 27 or if their respective set of descriptive parameters 26, 31 has been changed. Referring finally to FIG. 2C, the service provider compares the respective sets of descriptive parameters 41, 42 for the requesting subscriber 21 and responding subscriber 22. Matches 43 between the parameter sets 41, 42, are identified. In one embodiment, a match can either be an exact match, such as where both subscribers like to paint, or can be similar, such as where one subscriber enjoys listening to classical music while another subscriber enjoys listening to opera. Other types of matches are possible, including identifying dissimilarities and tangential interests and needs. The service provider can modify and add to the list of available parameters in response to subscriber requests. In addition, service providers can permit groups of subscribers to configure private parameters that would be used only for communication among members of that group. In such a case, the private parameters would not be a known or identifiable parameter, such as "I like movies" or "I am a doctor," but rather would be established to not match other parameters. Thus, a private parameter might be "Code XS1238." Typically, the private parameter would not have any meaning outside of use by members of the group. Persons who selected the private parameter would receive notifications whenever another person who also selected that parameter was in the same proximity.

Once at least one match 43 has been identified, the service provider will notify 44 the requesting subscriber 21 by sending a message informing of the match 43. The notification can take various forms, including simply flashing an indicator light, vibrating, playing a tone or song, and providing text, images, video, or other data that describes the responding subscriber 26. Where the subscriber receiving the notification has listed more than one parameter, the notification will indicate which of the listed parameters is a match in that particular instance. Importantly, the privacy of each responding subscriber 22 is protected through tunable, user-selectable features, such as not allowing the service provider to display a telephone number or other personal information to requesting subscribers until and if such information is permitted to be communicated by the responding subscriber 22. Similarly, the privacy of each requesting subscriber 21 is protected by allowing the subscriber to filter or block incoming notifications. Other types of privacy protection are possible.

Upon receiving the notification of the match 43, the requesting subscriber 21 can request further information to initiate contact with the responding subscriber 22. A back-and-forth dialogue between the requesting subscriber 21 and responding subscriber 22 may be necessary before the service provider is permitted to actually put the two parties in contact. In addition, either party can choose to answer or ignore the call. Throughout the exchange, the requesting subscriber 21 and responding subscriber 22 can also reset their descriptive parameters 41, 42 or localized coverage area privacy preferences to either increase or decrease their privacy.

Importantly, although the foregoing example describes a basic iteration of the service using "requesting subscriber" and a "responding subscriber," the service is capable of accommodating various forms and combinations of subscribers in requesting, responding, and listening roles, either active and participative or passive and non-participative. For example, where two subscribers list an identical parameter and are within the same relative proximity of one another whereby the service is initiated, both subscribers will generally receive a notice of the presence of the other subscriber. In effect, both subscribers are acting as a requesting subscriber and a responding subscriber with respect to the other subscriber. The service can also be configured such that a subscriber can be only a requesting subscriber with respect to a particular parameter and in a particular localized physical coverage area. For example, a subscriber may want to be notified when other persons have listed a particular parameter, such as "I like movies," only while in a particular area, but also may not want others subscribers to contact him. By contrast, a subscriber may act as a responding subscriber only with respect to a particular parameter and in a particular area. For example, a subscriber may want to send a notice to other subscribers that have listed a particular parameter in a particular area to, in effect, announce their presence without further initiating communication, but might not want to be actually contacted by other subscribers.

Figure 3A:
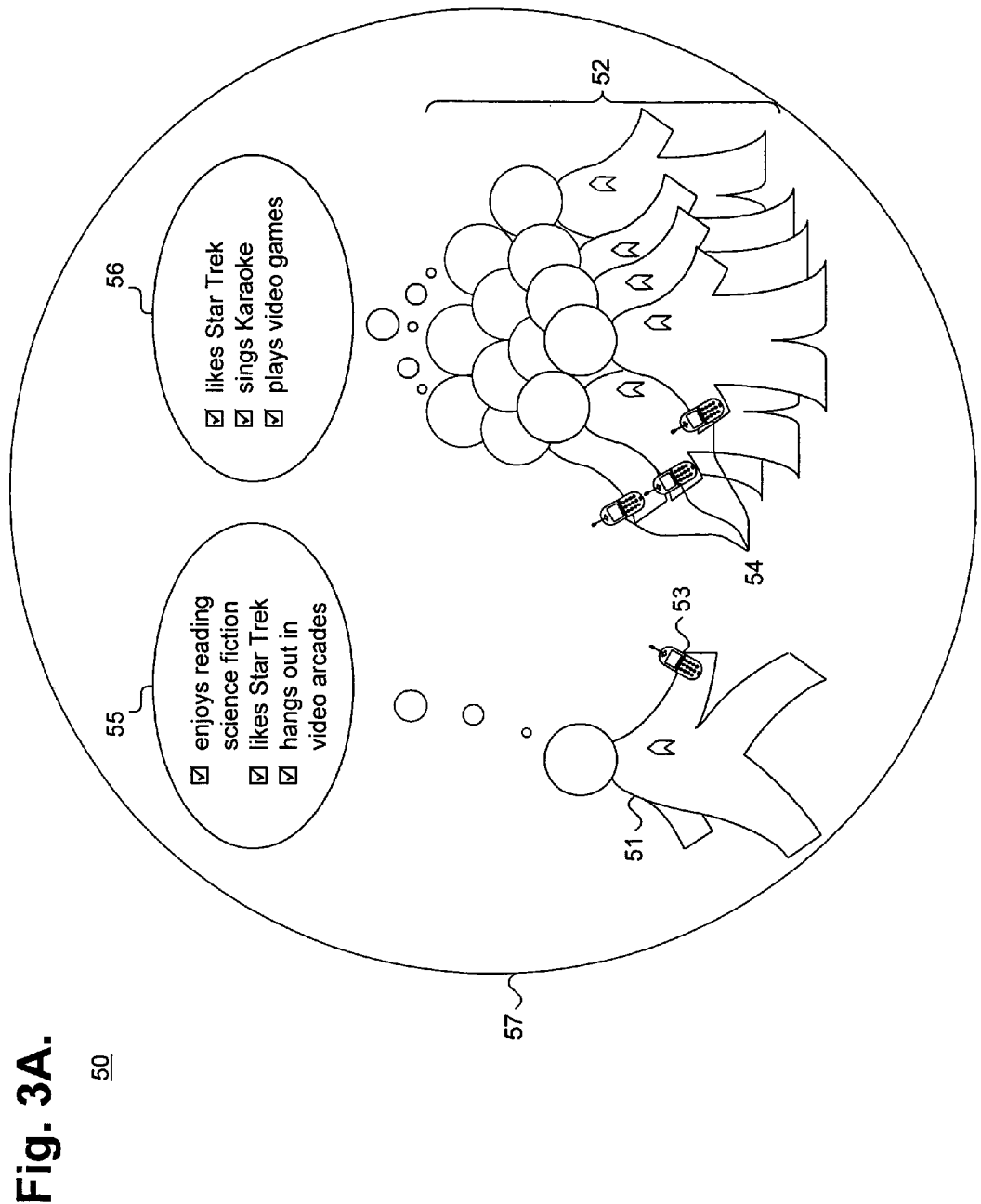
FIGS. 3A-B are diagrams showing, by way of example, one-to-many active proximity-based communication using the system of FIG. 1.
Figure 3B:
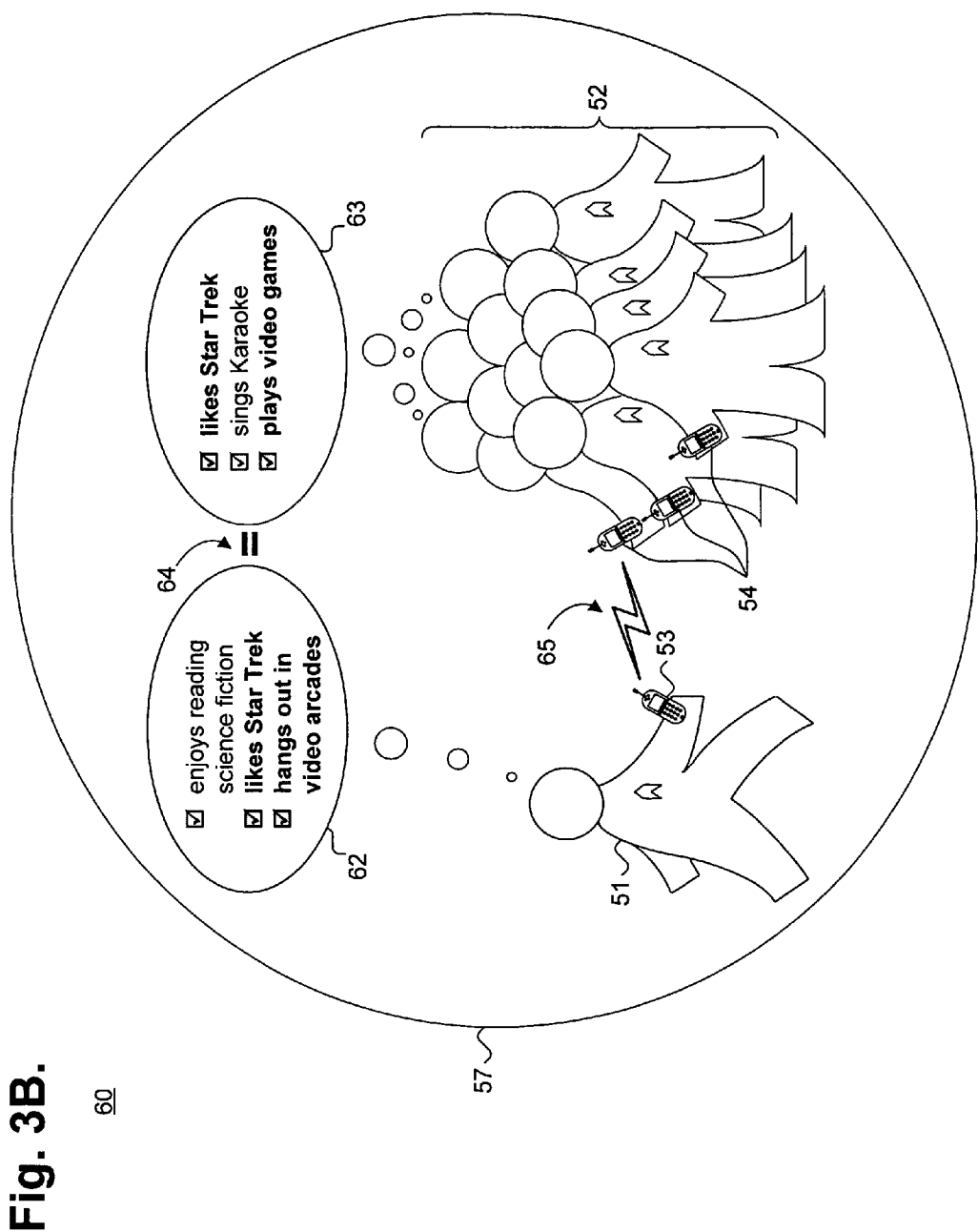

Although described as an example of communications facilitated between individual active participating subscribers, communications between groups of active participating subscribers are also possible. FIGS. 3A-B are diagrams 50, 60 showing, by way of example, one-to-many active proximity-based communication using the system 10 of FIG. 1. Active participating subscribers are allowed to receive notifications and to communicate as a collective body. Referring first to FIG. 3A, an individual subscriber 51 and a group of subscribers 52 are both active participants that have consented to allow the service provider to facilitate communications. Both the individual requesting subscriber 51 and each member of the responding group of participating subscribers 52 use mobile devices 53, 54 and have selected sets of descriptive parameters 55, 56 that reflect the types of information that they are wiling to share publicly through the service provider. The descriptive parameters 56 for the group 52 are compiled collectively and each member subscriber of the group 52 can still maintain their own personal, private set of descriptive parameters (not shown) and descriptive parameters as part of other groups. For example, the requesting individual subscriber 51 is willing to share that he enjoys reading Science Fiction, likes Star Trek, a syndicated television series from the 1960s that, generations later, continues to attract a cult-like following, and hangs out in video arcades, whereas the group 52 is willing to share that they, as a group, like Star Trek, sing Karaoke, and play video games.

As with one-to-one active proximity-based communication, described above with reference to FIGS. 2A-C, the service provider will not attempt to compare the respective sets of descriptive parameters 55, 56 until the individual requesting subscriber 51 and one or more members of group 52 are co-located within the same localized physical coverage area 57. Referring next to FIG. 3B, the individual requesting subscriber 51 and the group 52 are in the same localized physical coverage area 57 and the service provider then compares the respective sets of descriptive parameters 62, 63. Matches 64 are identified, which include an exact match, since the individual requesting subscriber 51 and group 52 both like Star Trek, and similarities, as the individual requesting subscriber 51 hangs out in video arcades and members of the group 52 play video games. Upon receiving the notification of the match 64, the individual requesting subscriber 51 can request further information to initiate contact with the group 52 and may, eventually, be put in contact. Although described With reference to communication between an individual participating subscriber and a group, communications can also be facilitated between one group and another group.

Figure 4A:
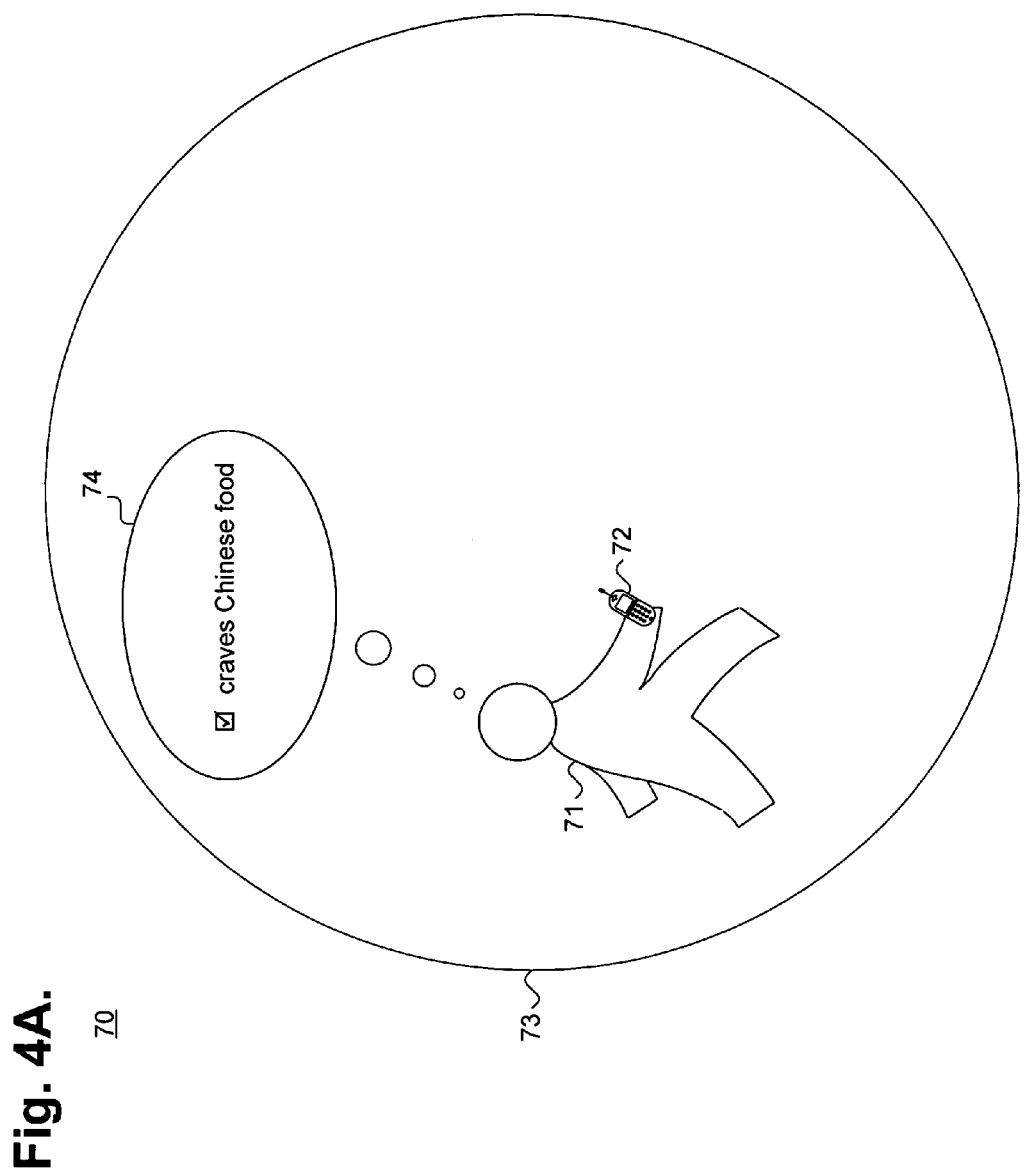
FIGS. 4A-B are diagrams showing, by way of example, an active-to-passive proximity-based communication using the system of FIG. 1.
Figure 4B:
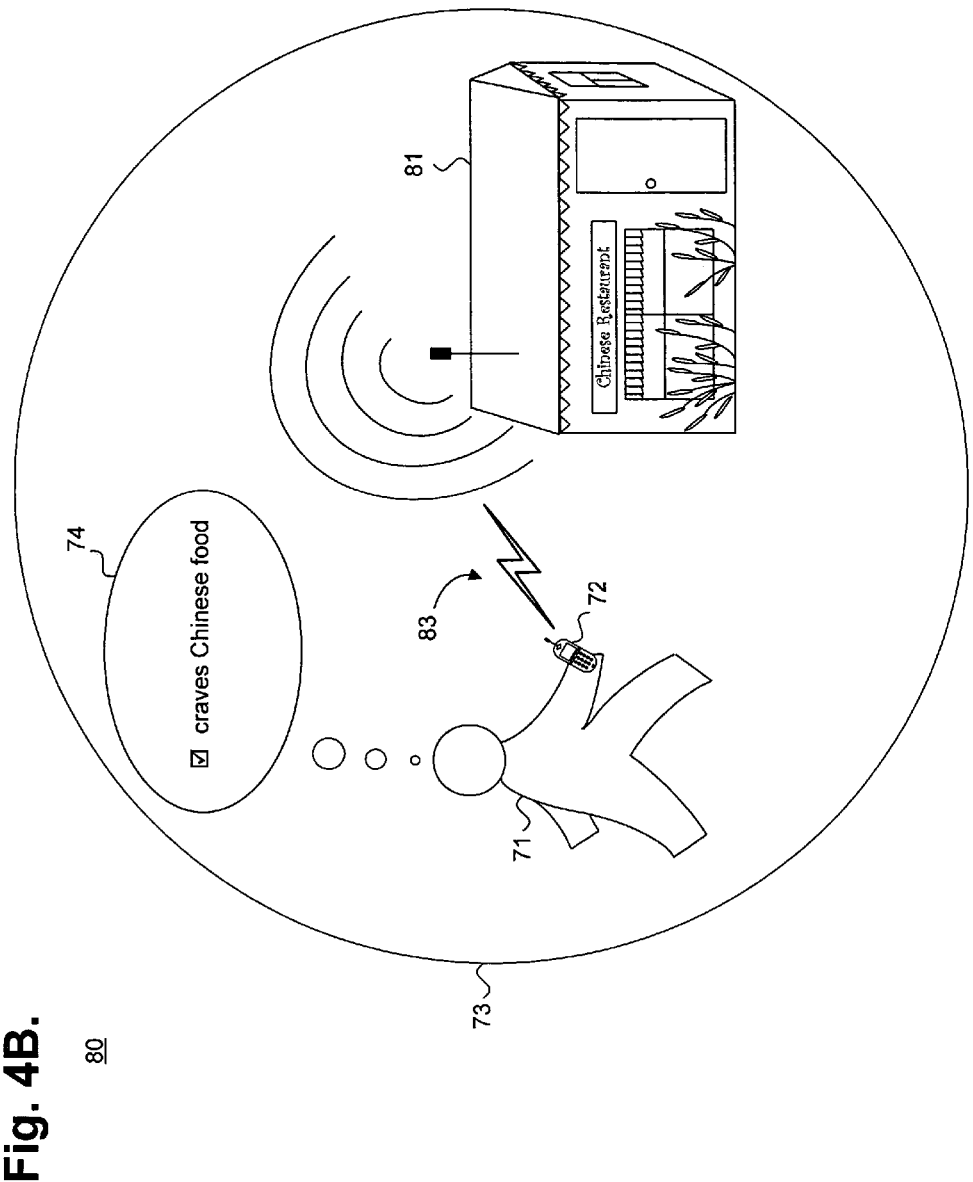

Participating subscribers need not be mobile nor actively expecting to engage in communication with another subscriber. For instance, a passive responding subscriber can send out notifications from a fixed location, such as advertisers who wish to inform the public of their whereabouts and the service or products offered. The subscriber would typically not expect participating subscribers to respond to the notifications, which preferably provide complete information in a single message. FIGS. 4A-B are diagrams 70, 80 showing, by way of example, an active-to-passive proximity-based communication using the system 10 of FIG. 1. Communication is triggered by physical proximity of an active participating subscriber and a passive participating subscriber. Referring first to FIG. 3A, an active requesting subscriber 71 has consented to allow the service provider to facilitate communications. The active requesting subscriber 71 uses a mobile device 72 and has selected a set of descriptive parameters 74 that reflect the types of information that he is willing to share publicly through the service provider. For example, the requesting subscriber 71 is willing to share that he craves Chinese food and, presumptively, is not particular about the type of Chinese food desired, such as Szechwan, Cantonese, Mandarin, Hunan, Peking, Shanghanese, and so forth.

Although the active requesting subscriber 71 is a willing participant, the service provider will not attempt to compare his set of descriptive parameters 74 with those descriptive parameters of other subscribers until they both are co-located within the same localized physical coverage area 73. Referring next to FIG. 4B, the active requesting subscriber 71 has entered into the same localized physical coverage area 73 as a passive responding subscriber 81. The passive responding subscriber 81 is passive in the sense that the subscriber 81 does not expect to engage in active communication with requesting subscribers. Instead, the passive requesting subscriber 81 is using the service provider to disseminate information, such as advertising, to other subscribers. For example, the passive responding subscribe 81 is a Chinese restaurant that hopes to attract hungry and non-discerning participating subscribers that crave Chinese food. The service provider compares the set of descriptive parameters 74 for the active requesting subscriber 71 and identifies matches.

Once at least one match has been identified, the service provider will notify 83 the active requesting subscriber 71 by sending a message informing of the match. Preferably, the message provides complete information regarding the passive responding subscriber 81 and does not require a back-and-forth exchange to facilitate communication. The message can include, for instance, the name of the Chinese restaurant, telephone number, and address. An active subscriber might also want to contact multiple, but related, passive subscribers. For example, a real estate company might recommend to potential home buyers to select "XYZ Realty Company, Seattle" as a parameter prior to driving around to look for homes to purchase. The XYZ Realty Company could then arrange for multiple, fixed, passive "subscriber" devices to be located in select homes that are being offered for sale. Whenever the potential home buyers are within proximity of one of the selected homes, they would receive a notice from the service providing information about the home, including description, driving directions, price, and so forth, and they could decide whether to stop and look. The parameters could be established to more specifically identify subscriber preferences, which would help to reduce unwanted notices. For example, the parameter might be set to "XYZ Realty Company, Seattle, Homes, Prices less than $300,000." In that case, the subscribers would only receive notices of homes that matched the price limiting variable. Other uses of such a service might include historical and other information provided to tourists traveling on foot or by car. Other types of messages are possible.

Figure 5A:
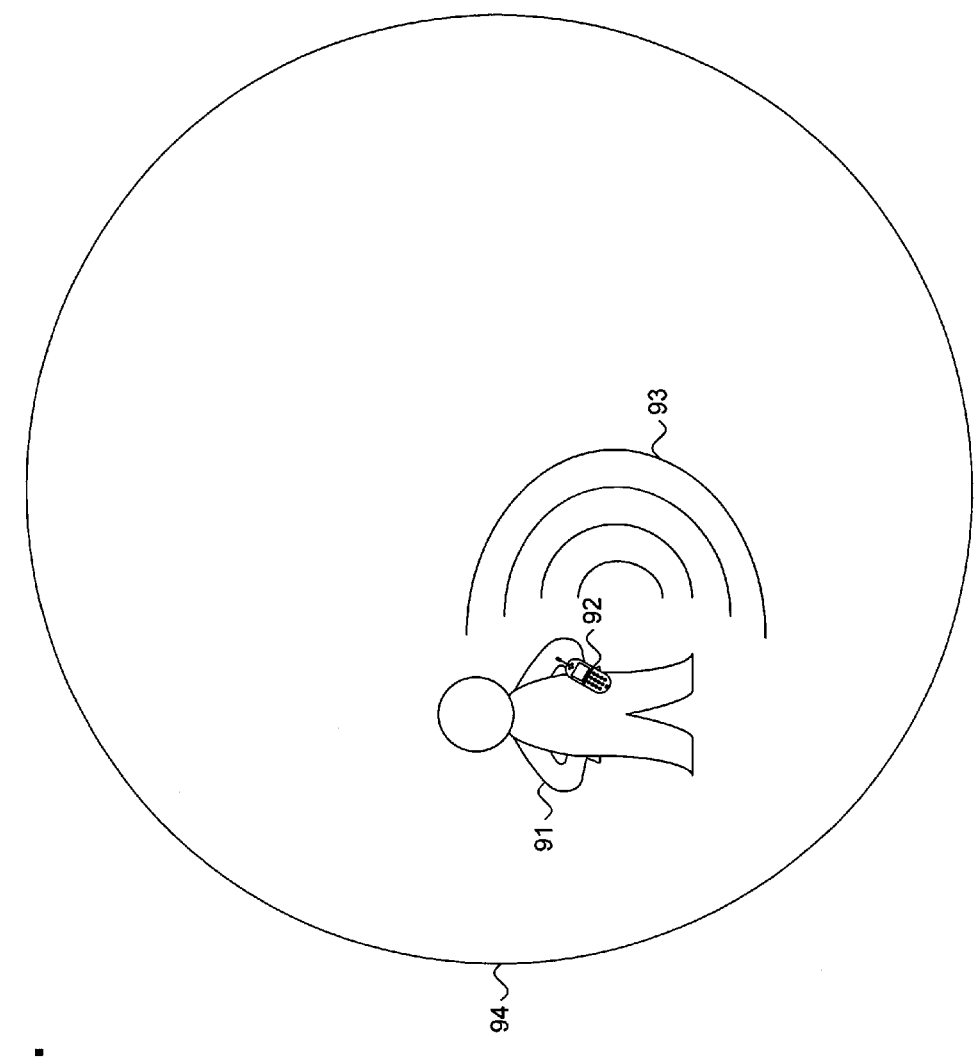

A requesting subscriber can also be passive or non-mobile, such as a subscriber in need of emergency or business services. FIGS. 5A-B are diagrams 80, 90 showing, by way of example, a passive-to-active proximity-based communication using the system 10 of FIG. 1. Communication is triggered by physical proximity of participating active subscribers in response to a request received from a passive participating subscriber. Referring first to FIG. 5A, a passive requesting subscriber 91 has consented to allow the service provider to facilitate communications. The passive requesting subscriber 91 uses a mobile device 92 and has selected a set of descriptive parameters that reflect the types of information that he is willing to share publicly through the service provider. The information 93 is shared passively in that the passive requesting subscriber 91 does not expect to engage in active communication with responding subscribers. For example, the passive requesting subscriber 91 needs a taxi-cab.

Although the passive requesting subscriber 91 is a willing participant, the service provider will not attempt to compare the set of descriptive parameters until an active responding subscriber is co-located within the same localized physical coverage area 94. Referring next to FIG. 5B, an active responding subscriber 101 has entered into the same localized physical coverage area 94 as the passive requesting subscriber 91. The service provider compares the set of descriptive parameters 102 for the active responding subscriber 101 and identifies matches. Once at least one match has been identified, the service provider will notify 103 the passive requesting subscriber 91 by sending a message informing of the match. The information 93 provided by the passive requesting subscriber 91 needs to be complete such that a response from active responding subscribers need not be required. For instance, the information 93 could provide the name, current location, and telephone number of a passive requesting subscriber 91. Other types of information are possible. The notification 103 acknowledges that an active responding subscriber 101 has been identified and can optionally provide contact information to facilitate communication if necessary. Other types of active and passive communication arrangements and scenarios are possible.

Notice Server

Figure 6:
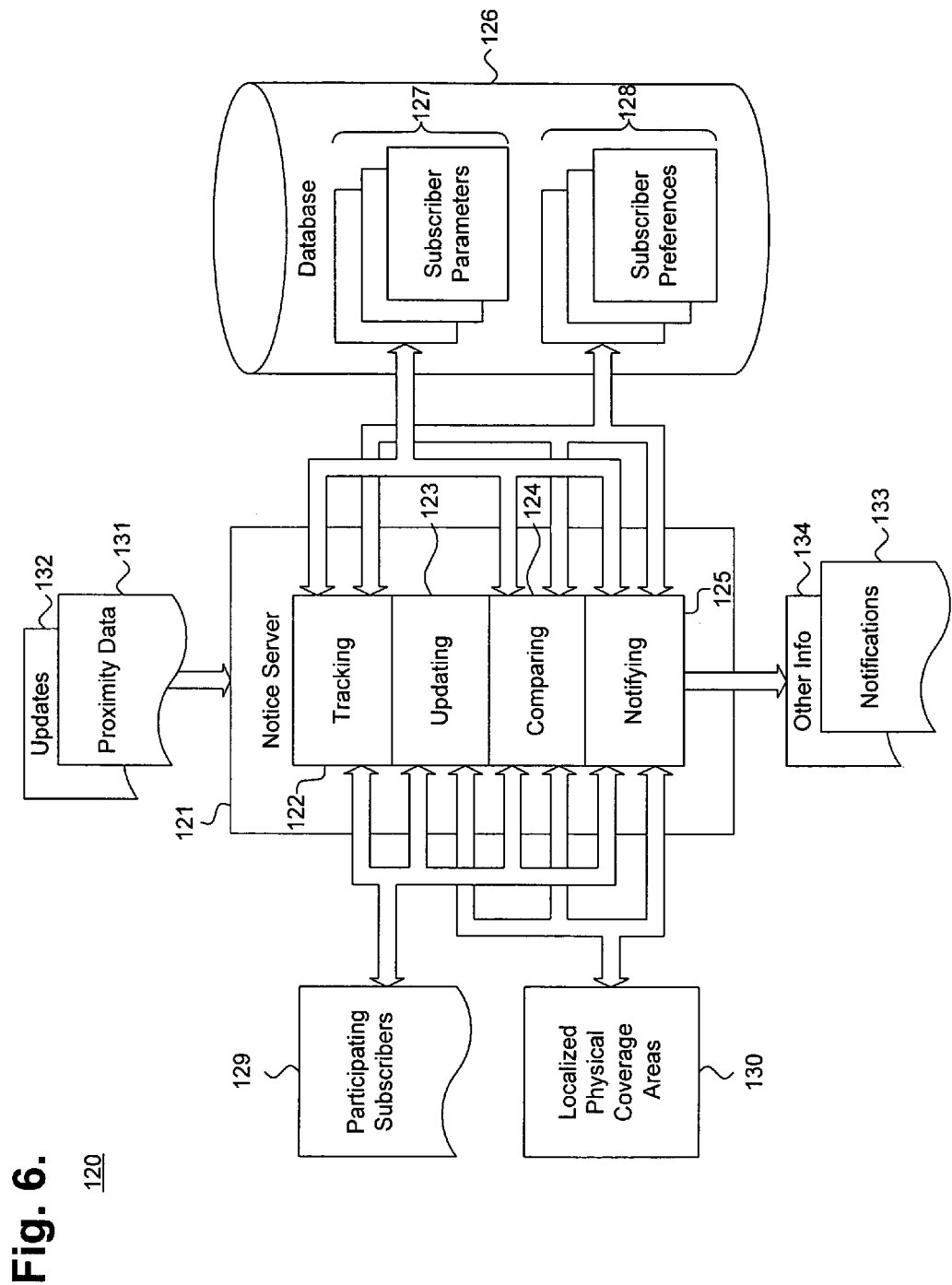
FIG. 6 is a functional block diagram showing a notice server for use in the system of FIG. 1.

To facilitate communications between mobile device subscribers, the service provider operates a notice server either as part of or separate from the Home Location Registry. In a further embodiment, the service provider is separate from the mobile communications provider and the proximity-based communication service is provided as an adjunct to the mobile communications service. FIG. 6 is a functional block diagram 120 showing a notice server 121 for use in the system 10 of FIG. 1. The notice server 121 operates in accordance with a sequence of process steps, as further described below with reference to FIG. 7.

The notice server 121 includes an updating component 123, tracking component 122, comparing component 124, and notifying component 125, and includes a database 126 storing subscriber parameters 127 and subscriber localized coverage area privacy preferences 128. The updating component 123 receives dynamic updates 132 from individual subscribers that can modify subscriber parameters 127 and subscriber localized coverage area privacy preferences 128. Consenting subscribers can opt to not participate by either failing to select subscriber parameters 127 or by setting a specific do-not-disturb subscriber localized coverage area privacy preference 128. All other consenting subscribers are implicitly termed to be participating subscribers 129.

The tracking component 122 registers the presence of the mobile devices of participating subscribers 129 within localized physical coverage areas 130. The tracking component 122 receives proximity data 131 to continually update the known whereabouts of the mobile device of each participating subscriber 129.

The comparing component 124 processes implicit and express requests to communicate from active and passive participating subscribers 129 by identifying other participating subscribers 129 having mobile devices also within the same localized physical coverage area 130 or who have changed their subscriber parameters 127 or subscriber localized coverage area privacy preferences 128. Once identified, the comparing component 124 compares the subscriber parameters 127 of the participating subscribers 129, taking into account any applicable subscriber localized coverage area privacy preferences 128.

Finally, the notifying component 125 sends notifications 133 to one or more of the participating subscribers 129 based on the corresponding subscriber localized coverage area privacy preferences 128. In response to the notifications 133, the notifying component 125 can provide other information 134, such as telephone numbers, images, videos, or other data, to facilitate communications.

Other components, and arrangements of the various functions performable by the notice server 121 are possible. In one embodiment, the notice server 121 is a general purpose, programmed digital computing device consisting of a central processing unit, random access memory, non-volatile secondary storage, such a hard drive or CD ROM, network interfaces, and peripheral devices, including user interfacing means, such as a keyboard and display. Program code, including software programs, and data are loaded into the memory for execution and processing and results are generated for display, output, transmittal, or storage.

Each component is implemented as is a computer program, procedure or module written as source code in a conventional programming language, such as the C++ programming language, and is presented for execution as object or byte code, as is known in the art. Alternatively, the components could also be implemented in hardware, either as integrated circuitry or burned into read-only memory components. The various implementations of the source code and object and byte codes can be held on a computer-readable storage medium or embodied on a transmission medium in a carrier wave.

Method Description

Figure 7:
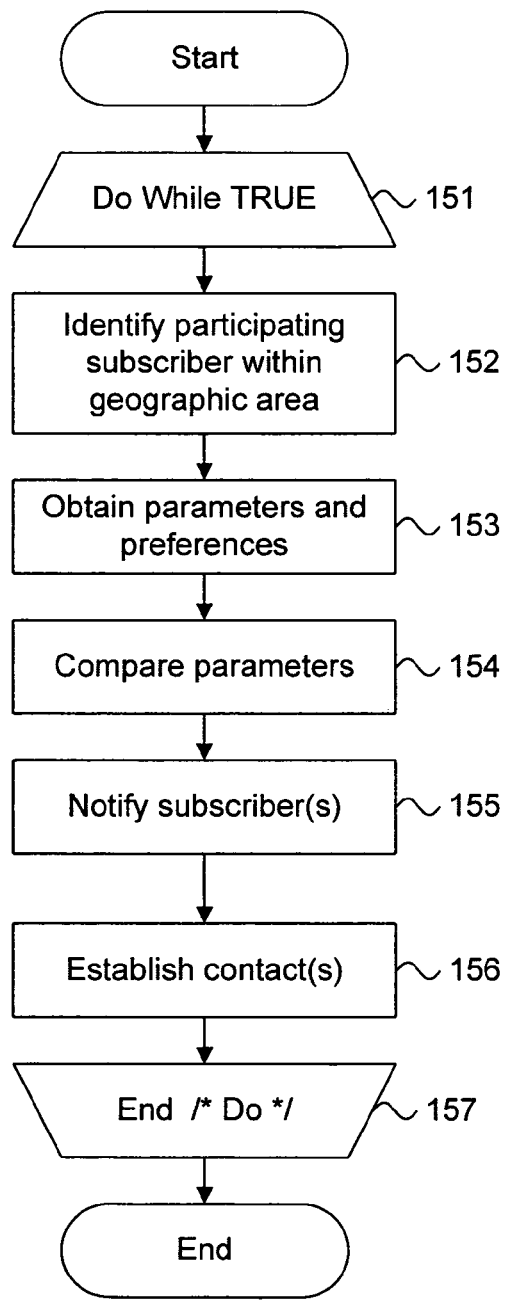
FIG. 7 is a flow diagram showing a method for facilitating proximity-based communication through dynamic communication device registration, in accordance with one embodiment.

Communication is facilitated by the service provider that, in one embodiment, operates a notice server 121 that is centrally accessible by participating subscribers through the mobile communications service network. In a further embodiment, the service provider foregoes a dedicated centralized notice server 121 and instead provides communication in a distributed manner through functionality performed by individual mobile devices. Whether centralized or distributed, the basic flow of processing required to facilitate communications is the same. FIG. 7 is a flow diagram showing a method 150 for facilitating proximity-based communication through dynamic communication device registration, in accordance with one embodiment. Generally, the method 150 proceeds by iteratively processing in a continuous cycle (blocks 151-157).

During each cycle (block 151), participating subscribers within a localized physical coverage area are identified (block 152), either by entering into a new localized physical coverage area or by changing subscriber parameters. The parameters and localized coverage area privacy preferences of each participating subscriber are obtained (block 153) and the subscriber parameters are compared (block 154). Those subscribers having matching or similar subscriber parameters are notified (block 155) in light of any subscriber localized coverage area privacy preferences chosen and, at the option of one or more of the notified participating subscribers, contact is established (156), such as by providing further information or facilitating a back-and-forth exchange between the participating subscribers. Other types of operations are possible.

While the invention has been particularly shown and described as referenced to the embodiments thereof, those skilled in the art would understand that the foregoing and other changes in form and detail may be made therein without departing from the spirit and scope of the invention.

What is claimed is:

1. A system for facilitating proximity-based communications through dynamic communication device registration, comprising:

a database configured to store:

identities of a multiplicity of communication devices and descriptive parameters that have been autonomously selected by a subscriber for each of the communication devices, wherein the descriptive parameters have been selected from the group comprising personal, cultural, social, religious, political, commercial physical, types of people, types of places, types of businesses, types of services, interests of the subscriber and needs of the subscriber; and collections of subscriber groups comprising pluralities of communication devices sharing matching ones of the descriptive parameters;

a detection module configured to detect the communication devices with such descriptive parameters that are matching and to form subscriber groups comprising pluralities of the communications devices sharing matching ones of the descriptive parameters;

a tracking module configured to register a presence of a plurality of the communication devices within a localized physical coverage area; and a facilitator module configured to subsequently facilitate dynamic communication between two or more subscribers comprising:
- a request processor configured to process a request from a requesting subscriber to communicate with at least one other subscriber belonging to at least one such subscriber group in common and having a communication device within the same localized physical coverage area, comprising:
  - a comparison module configured to continuously identify one or more subscribers having communication devices within the localized physical coverage area and to continually compare the descriptive parameters selected by the one or more subscribers prior to and during the communication; and
  - a notification module configured to continually notify the requesting subscriber of at least one of the one or more subscribers with at least one matching descriptive parameter during the communication;
- a response processor configured to process a response to the request to communicate from a responding subscriber of the at least one such subscriber group in common; and
- a reply processor configured to process a reply to the responding subscriber from the requesting subscriber.

2. The system according to claim 1, wherein the notification module is further configured to provide contact information to enable communications between the communication device of the requesting subscriber and the communication devices of the responding subscribers.

3. The system according to claim 2, wherein the contact information is initially provided to the requesting subscriber.

4. The system according to claim 2, wherein the contact information comprises at least one of a telephone number, identifying data, and rendezvous data.

5. The system according to claim 2, further comprising:
localized coverage area privacy preferences defining a localized coverage area profile, wherein the notification module is further configured to apply the localized coverage area privacy preferences triggered in response to an attempt at establishing the communications.

6. The system according to claim 5, wherein the localized coverage area localized coverage area privacy preferences comprise at least one of filtering, screening, and hiding the information.

7. The system according to claim 1, wherein one of the requesting subscriber and the responding subscriber is passive.

8. The system according to claim 1, wherein at least one of the requesting subscriber and the responding subscriber comprise a plurality of participating subscribers having a shared set of descriptive parameters.

9. The system according to claim 1, wherein the database is further configured to store at least one general category of descriptive parameters and one or more specific category of descriptive parameters hierarchically related to the at least one general category of descriptive parameters, further comprising:
a relationship module configured to provide selection of a descriptive parameter from one such specific category to include selection of a descriptive parameter from one such hierarchically-related general category.

10. The system according to claim 1, further comprising:
a group module configured to allow a plurality of subscribers to form a group by creation of at least one private descriptive parameter, wherein selection and comparison of the at least one private descriptive parameter is limited to subscribers within the group.

11. The system according to claim 1, wherein the communication devices are selected from the group comprising mobile devices and non-mobile devices.

12. A method for facilitating proximity-based communications through dynamic communication device registration, comprising:
identifying a multiplicity of communication devices;
storing descriptive parameters that have been autonomously selected by a subscriber for each of the communication devices, wherein the descriptive parameters have been selected from the group comprising personal, cultural, social, religious, political, commercial physical, types of people, types of places, types of businesses, types of services, interests of the subscriber and needs of the subscriber;
detecting the communication devices with such descriptive parameters that are matching;
forming subscriber groups comprising pluralities of the communications devices sharing matching ones of the descriptive parameters;
registering a presence of a plurality of the communication devices within a localized physical coverage area;
subsequently facilitating dynamic communication between two or more subscribers comprising:
- processing a request from a requesting subscriber to communicate with at least one other subscriber belonging to at least one such subscriber group in common and having a communication device within the same localized physical coverage area, comprising:
  - continuously identifying one or more subscribers having communication devices within the localized physical coverage area;
  - continually comparing the descriptive parameters selected by the one or more subscribers prior to and during the communication; and
  - continually notifying the requesting subscriber of at least one of the one or more subscribers with at least one matching descriptive parameter during the communication;
- processing a response to the request to communicate from a responding subscriber of the at least one common subscriber group; and
- processing a reply to the responding subscriber from the requesting subscriber.

13. The method according to claim 12, further comprising:
providing contact information to enable communications between the communication device of the requesting subscriber and the communication devices of the responding subscribers.

14. The method according to claim 13, wherein the contact information is initially provided to the requesting subscriber.

15. The method according to claim 13, wherein the contact information comprises at least one of a telephone number, identifying data, and rendezvous data.

16. The method according to claim 13, further comprising:
storing localized coverage area privacy preferences defining a localized coverage area profile; and
applying the localized coverage area privacy preferences triggered in response to an attempt at establishing the communications.

17. The method according to claim 16, wherein the localized coverage area localized coverage area privacy preferences comprise at least one of filtering, screening, and hiding the information.

18. The method according to claim 12, wherein one of the requesting subscriber and the responding subscriber is passive.

19. The method according to claim 12, wherein at least one of the requesting subscriber and the responding subscriber comprise a plurality of participating subscribers having a shared set of descriptive parameters.

20. The method according to claim 12, further comprising:
   defining at least one general category of descriptive parameters and one or more specific category of descriptive parameters hierarchically related to the at least one general category of descriptive parameters; and
   providing selection of a descriptive parameter from one such specific category to include selection of a descriptive parameter from one such hierarchically-related general category.

21. The method according to claim 12, further comprising:
   identifying at least one such descriptive parameter, which comprises a private descriptive parameter;
   identifying the subscribers who have autonomously selected the private descriptive parameter;
   forming a private group comprising the identified subscribers;
   continuously identifying only the subscribers who have selected the private descriptive parameter;
   processing a request, by at least one of the identified subscribers, for a notification of the other identified subscribers.

22. The method according to claim 12, wherein the communication devices are selected from the group comprising mobile devices and non-mobile devices.

23. A computer-readable storage medium with encoded instructions therein, said instructions performing the method according to claim 12 when executed by a computer.

24. An apparatus for facilitating proximity-based communication through dynamic communication device registration, comprising:
   means for facilitating proximity-based communications through dynamic communication device registration, comprising:
   means for maintaining a database storing:
      identities of a multiplicity of communication devices and descriptive parameters that have been autonomously selected by a subscriber for each of the communication devices, wherein the descriptive parameters have been selected from the group comprising personal, cultural, social, religious, political, commercial physical, types of people, types of places, types of businesses, types of services, interests of the subscriber and needs of the subscriber; and
      collections of subscriber groups comprising pluralities of communication devices with matching ones of the descriptive parameters;
   means for detecting the communication devices with such descriptive parameters that are matching;
   means for forming subscriber groups comprising pluralities of the communications devices with matching ones of the descriptive parameters;
   means for registering a presence of a plurality of the communication devices within a localized physical coverage area; and
   means for subsequently facilitating dynamic communication between two or more subscribers comprising:
      means for processing a request from a requesting subscriber to communicate with at least one other subscriber belonging to at least one such subscriber group in common and having a communication device within the same localized physical coverage area, comprising:
         means for continuously identifying one or more subscribers having communication devices within the localized physical coverage area;
         means for continually comparing the descriptive parameters of the requesting subscriber and the descriptive parameters of the one or more subscribers prior to and during the communication; and
         means for continually notifying the requesting subscriber of at least one of the one or more subscribers with at least one matching descriptive parameter during the communication;
      means for processing a response to the request to communicate from a responding subscriber of the at least one common subscriber group; and
      means for processing a reply to the responding subscriber from the requesting subscriber.

* * * * *